United States Patent
Bedell et al.

(10) Patent No.: US 7,509,671 B1
(45) Date of Patent: Mar. 24, 2009

(54) SYSTEMS AND METHODS FOR ASSIGNING PRIORITY TO JOBS IN A REPORTING SYSTEM

(75) Inventors: Jeffrey A. Bedell, Arlington, VA (US);
Benjamin Z. Li, Great Falls, VA (US);
Luis V. Orozco, Vienna, VA (US);
Ramprasad Polana, Sterling, VA (US)

(73) Assignee: Microstrategy Incorporated, McLean, VA (US)

(*) Notice: Subject to any disclaimer, the term of this patent is extended or adjusted under 35 U.S.C. 154(b) by 1111 days.

(21) Appl. No.: 09/884,475

(22) Filed: Jun. 20, 2001

(51) Int. Cl.
*G06F 9/46* (2006.01)
(52) U.S. Cl. .................. 726/6; 718/102; 718/103
(58) Field of Classification Search .......... 713/200, 713/202; 726/18, 19, 5, 6, 7, 26; 370/60.1, 370/94.2; 718/103
See application file for complete search history.

(56) References Cited

U.S. PATENT DOCUMENTS

| | | | |
|---|---|---|---|
| 4,688,195 A | | 8/1987 | Thompson |
| 4,829,423 A | | 5/1989 | Tennant |
| 5,095,369 A | * | 3/1992 | Ortiz et al. ................. 358/296 |
| 5,197,005 A | | 3/1993 | Shwartz |
| 5,224,099 A | * | 6/1993 | Corbalis et al. ............ 370/412 |
| 5,247,677 A | * | 9/1993 | Welland et al. ............ 718/103 |
| 5,276,870 A | | 1/1994 | Shan |
| 5,313,454 A | * | 5/1994 | Bustini et al. .............. 370/231 |
| 5,418,943 A | | 5/1995 | Borgida |
| 5,421,008 A | | 5/1995 | Banning |
| 5,442,730 A | * | 8/1995 | Bigus ......................... 706/19 |
| 5,469,560 A | | 11/1995 | Beglin |
| 5,504,890 A | | 4/1996 | Sanford |
| 5,521,916 A | * | 5/1996 | Choudhury et al. ........ 370/414 |
| 5,542,088 A | * | 7/1996 | Jennings et al. ............ 718/103 |
| 5,547,176 A | * | 8/1996 | Williams et al. ............ 270/37 |
| 5,551,023 A | | 8/1996 | Alonso |
| 5,555,403 A | | 9/1996 | Cambot |
| 5,584,024 A | | 12/1996 | Shwartz |
| 5,594,791 A | * | 1/1997 | Szlam et al. ............ 379/265.09 |
| 5,659,734 A | | 8/1997 | Tsuruta |
| 5,664,182 A | | 9/1997 | Nirenberg |
| 5,692,181 A | | 11/1997 | Anand |

(Continued)

OTHER PUBLICATIONS

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

(Continued)

*Primary Examiner*—Matthew B Smithers
(74) *Attorney, Agent, or Firm*—Hunton & Williams LLP

(57) ABSTRACT

The methods and systems of the invention provide for processing of jobs, that comprise one or more reports to be processed in a reporting system, by assigning a priority to a job. The priority may include a queue or a queue set priority, as well as a sub-queue priority in accordance with some embodiments of the methods and systems of the invention. Once the priority is assigned, the job is placed into a selected queue, selected from a plurality of possible queues, based on the queue priority assigned to the job. The job may also be designated to a particular sub-queue within the selected queue, i.e., based on the sub-queue priority. Then, the job is processed based on the priority.

23 Claims, 10 Drawing Sheets

U.S. PATENT DOCUMENTS

| | | | | |
|---|---|---|---|---|
| 5,757,771 | A * | 5/1998 | Li et al. | 370/235 |
| 5,781,911 | A | 7/1998 | Young | |
| 5,864,856 | A | 1/1999 | Young | |
| 5,872,938 | A * | 2/1999 | Williams | 710/112 |
| 5,878,416 | A | 3/1999 | Harris | |
| 5,914,878 | A | 6/1999 | Yamamoto | |
| 5,987,492 | A * | 11/1999 | Yue | 718/102 |
| 6,000,001 | A * | 12/1999 | Larson | 710/244 |
| 6,003,045 | A | 12/1999 | Freitas | |
| 6,003,101 | A | 12/1999 | Williams | |
| 6,085,193 | A | 7/2000 | Malkin | |
| 6,145,031 | A * | 11/2000 | Mastie et al. | 710/52 |
| 6,154,766 | A | 11/2000 | Yost | |
| 6,209,018 | B1 * | 3/2001 | Ben-Shachar et al. | 718/105 |
| 6,247,008 | B1 | 6/2001 | Cambot | |
| 6,271,927 | B1 * | 8/2001 | Kohtani et al. | 358/1.16 |
| 6,279,033 | B1 | 8/2001 | Selvarajan | |
| 6,341,303 | B1 * | 1/2002 | Rhee et al. | 718/104 |
| 6,662,203 | B1 * | 12/2003 | Kling et al. | 718/103 |
| 6,728,792 | B2 * | 4/2004 | Wagner | 710/6 |
| 7,216,347 | B1 * | 5/2007 | Harrison et al. | 718/103 |
| 2002/0023122 | A1 * | 2/2002 | Polizzi et al. | 709/202 |

OTHER PUBLICATIONS

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Mamber, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

* cited by examiner

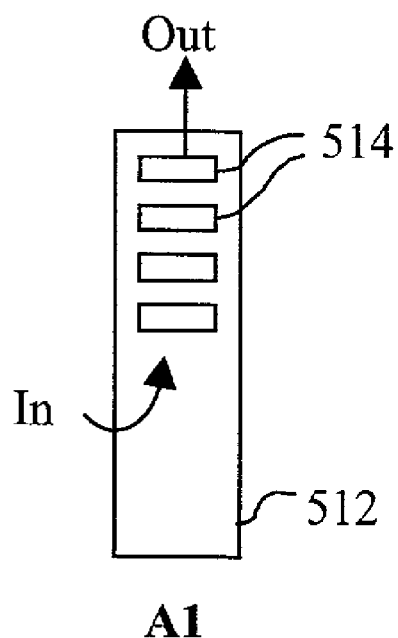
Fig. 7
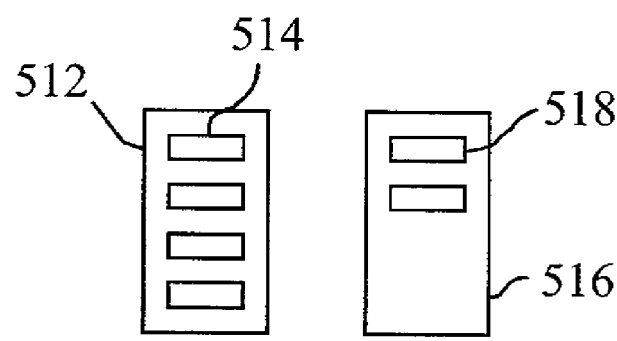
Fig. 8

SYSTEMS AND METHODS FOR ASSIGNING PRIORITY TO JOBS IN A REPORTING SYSTEM

FIELD OF THE INVENTION

This invention relates to a method and system for establishing priorities among competing jobs and for servicing those jobs using one or more processing units, wherein the jobs comprise reports, or query requests, to be processed in a reporting system, which may include an Online Analytical Processing (OLAP) system, business intelligence or other reporting system.

BACKGROUND OF THE INVENTION

Existing reporting systems, and in particular data warehouse systems, operate by obtaining requests, either from users of the reporting system or from a scheduled event, for example, performing processing to address those requests, and thereafter outputting information to the user, for example, that is responsive to the request. Accordingly, it should be appreciated that a request may be a scheduled report or an alert, for example, and not just a user request. A request might be characterized as a "job." The ability to complete jobs as a result of a scheduled event or for a user, as well as any other individual utilizing the reporting system, depends both on the number of other requests, i.e., by other users, that has been submitted as well as the processing resources available to the reporting system.

One goal in existing reporting systems is to ensure efficient usage of processing resources in completing the various computing jobs. However, various other factors should also be taken into account. For example, processing very large jobs on a continued basis would ensure efficient usage of resources. However, such processing of very large jobs only would be to the detriment of a user who submits small jobs, which are not completed in a reasonable time. Accordingly, it is desired to prioritize jobs in some reasonable manner while insuring the efficient usage of processing resources. In addition, organizations may want to control how processing resources for a reporting system are divided among various user communities. However, conventional systems and methods fall short of addressing these desired objectives. Further, conventional methods and systems suffer from other drawbacks.

SUMMARY OF THE INVENTION

The methods and systems of the invention provide for processing of jobs by initially assigning a priority to a job wherein the job is preferably a report being executed in a decision support system against a data warehouse. The priority may include a queue set priority, as well as a queue priority in accordance with embodiments of the methods and systems of the invention. Once the priority is assigned, the job is placed into a selected queue set, selected from a plurality of possible queue sets, based on the queue set priority assigned to the job. The job may also be designated to a particular queue within the selected queue set, i.e., based on the queue priority. Then, the job is processed based on the selected queue set, and possibly queue, into which the job is placed.

One aspect of the systems and methods of the invention relates to defining one or more queue sets. Each queue set may be defined based on one or more queue set factors. The queue set factors may include one or more of a range of priority values, or other queue set factors. Another aspect of the invention includes assigning one or more priority types to jobs. The priority types may include one or more of a queue set priority, a queue priority, a relative priority value (e.g., to prioritize jobs within a queue relative to one another) and other priority types. Once a job has been assigned its one or more priorities, one or more techniques may be used to determine one or more of: in which queue set the job should be placed (if more than one queue set is used), in which queue of a queue set the job should be placed (if a queue set has more than one queue) where within a queue the job should be placed relative to other jobs in the queue, and other priority determinations.

A further aspect of the invention relates to the servicing of jobs. Servicing of the jobs, which have been prioritized, relates to selecting the next job to be serviced. This selection is based on the priority assigned to the job, a set of priority queues and an available thread, for example. In other words, the next available thread, i.e., the next available processing unit, performs the next job based on the priorities of each respective job.

Other objects and advantages of the invention will be apparent to one of ordinary skill in the art upon reviewing the detailed description of the invention.

BRIEF DESCRIPTION OF THE DRAWINGS

FIG. 7 is a diagram showing a queue and illustrating the first in first out technique according to an embodiment of the invention.

FIG. 8 is a diagram showing multiple queues and illustrating the fixed thread-selfish technique according to an embodiment of the invention.

DETAILED DESCRIPTION OF THE INVENTION

The present invention relates to systems and methods for prioritizing jobs, such as reports to be processed by a reporting system. As used herein, a "reporting system" may include an Online Analytical Processing (OLAP) system, a business intelligence system or other reporting system, for example. For context in understanding the present invention, FIGS. 1 and 2 are shown that illustrate an embodiment of such a system for which the invention may be used.

Figure 1:
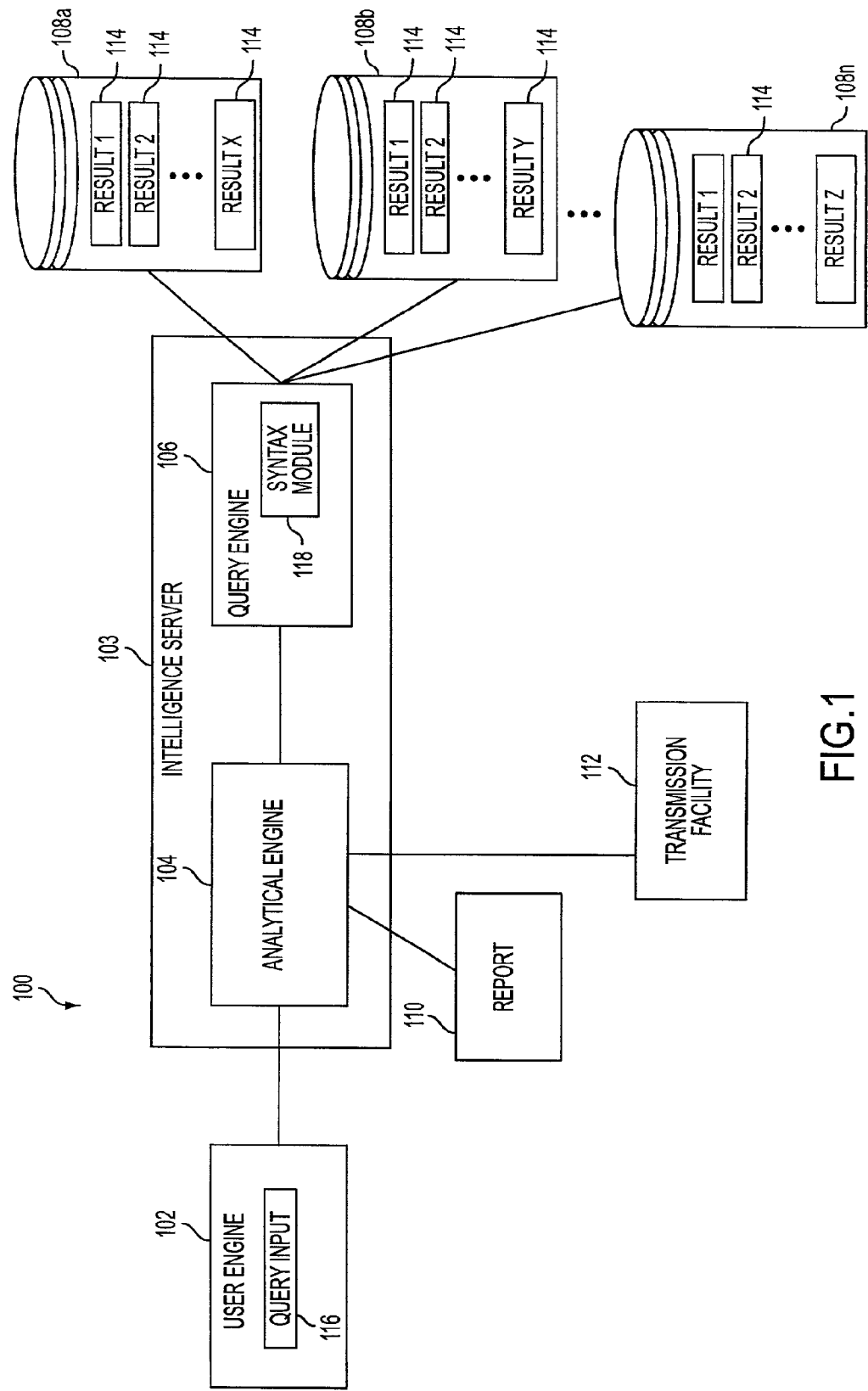
FIG. 1 is a block diagram illustrating an architecture for a system according to an embodiment of the invention.

FIG. 1 is a block diagram illustrating a system 100 by which a variety of data resources may be accessed for business analytic, report generation and other intelligence purposes according to an embodiment of the invention. According to a preferred embodiment, the system 100 may comprise an Online Analytical Processing (OLAP) decision support system (DSS). In particular, FIG. 1 may comprise a portion of the MicroStrategy 7 or 7.1 platform which provides a preferred system in which the present invention may be implemented.

In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

In addition, system 100 may enable the creation of reports or services that are processed according to a schedule. Users may then subscribe to the service, provide personalization criteria and have the information automatically delivered to the user, as described in U.S. Pat. No. 6,154,766 to Yost et al., which is commonly assigned and hereby incorporated by reference.

As illustrated in FIG. 1, a business, a government or another user may access the resources of the system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a Microsoft Windows™ NT operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache platform, an OpenStep™ operating system, or another similar operating system or platform. According to one embodiment of the present invention, analytical engine 104 and query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b ... 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b ... 108n, depending on which of the data resources produce hits from processing the search query. In some embodiments of the system 100 of the invention, the results 114 may be maintained on one or more of the data storage devices 108a, 108b ... 108n to permit one or more refinements, iterated queries, joinders or other operations to be performed on the data included in the results 114 before passing the information included in the results 114 back to the analytical engine 104 and other elements of the system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1 M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b ... 108n. The report 110 may be presented to the user via the user engine 102, and, in some embodiments, may be temporarily or permanently stored on the user engine 102, a client machine or elsewhere, or printed or otherwise output. In some embodiments of the system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users may then receive access to reports through various types of data delivery devices including telephones, pagers, PDAs, WAP protocol devices, email, facsimile, and many others. In addition, subscribers may specify trigger conditions so that the subscriber receives a report only when that condition has been satisfied, as described in detail in the '766 patent. The platform of FIG. 1 may have many other uses, as described in detail with respect to the MicroStrategy 7 and 7.1 platform, the details of which will be appreciated by one of ordinary skill in the reporting and decision support system art.

Figure 2:
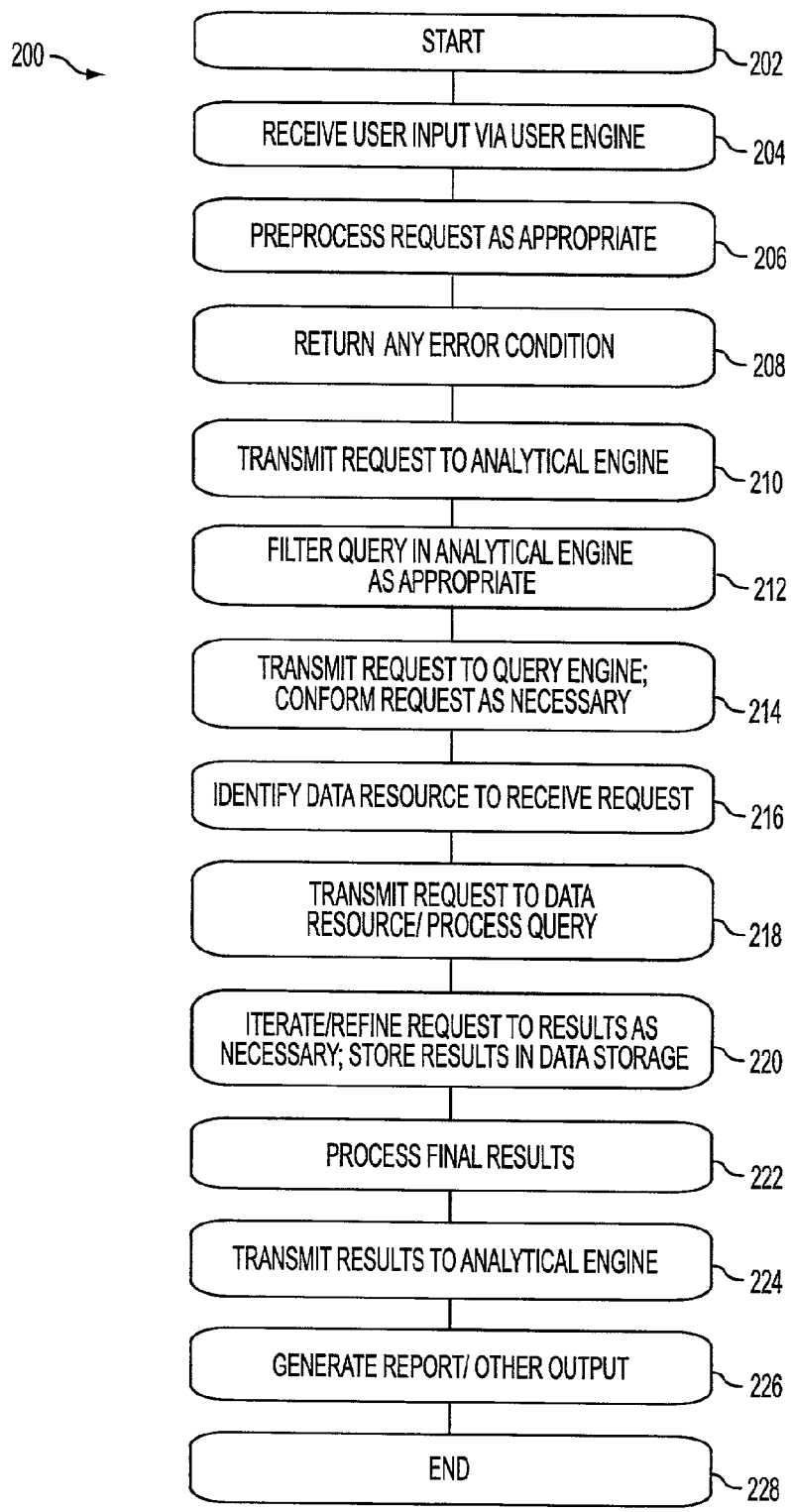
FIG. 2 is a flowchart illustrating steps performed by a process utilizing a query engine according to an embodiment of the invention.

The steps performed in a method 200 for processing data according to the invention are illustrated in the flowchart of FIG. 2. In step 202, the method 200 begins. In step 204, the user may supply input, such as a query or a request for information, via the user engine 102. In step 206, the user input query may be preliminarily processed, for instance, to determine whether it includes valid fields and for other formatting and error-flagging issues. In step 208, any error conditions may be trapped and an error message presented to the user, for correction of the error conditions. In step 210, if a query is in a valid format, the query may then be transmitted to the analytical engine 104.

In step 212, the analytical engine 104 may further process the input query as appropriate to ensure the intended results 114 may be generated to apply the desired analytics. In step 214, the query engine 106 may further filter, format and otherwise process the input query to ensure that the query is in a syntax compatible with the syntax of the data storage devices 108a, 108b ... 108n. In step 216, one or more appropriate databases or other resources within the data storage devices 108a, 108b ... 108n may be identified to be accessed for the given query.

In step 218, the query may be transmitted to the data storage devices 108a, 108b ... 108n and the query may be processed for hits or other results 114 against the content of the data storage devices 108a, 108b ... 108n. In step 220, the results 114 of the query may be refined, and intermediate or other corresponding results 114 may be stored in the data storage devices 108a, 108b ... 108n. In step 222, the final results 114 of the processing of the query against the data storage devices 108a, 108b ... 108n may be transmitted to the analytical engine 104 via the query engine 106. In step 224, a plurality of analytical measures, filters, thresholds, statistical or other treatments may be run on the results 114. In step 226, a report 110 may be generated. The report 110, or other output of the analytic or other processing steps, may be presented to the user via the user engine 102. In step 228, the method 200 ends.

Hereinafter, further aspects of the systems and methods of the invention will be described with reference to the analytical engine 104 and the report 110. That is, as described below, the invention will be described with reference to establishing priorities among report jobs processed in the analytical engine 104, and for servicing those jobs within a processing unit. However, it should be appreciated that the priority schemes and techniques described herein could be used in any environment in which jobs are prioritized prior to processing.

Figure 3:
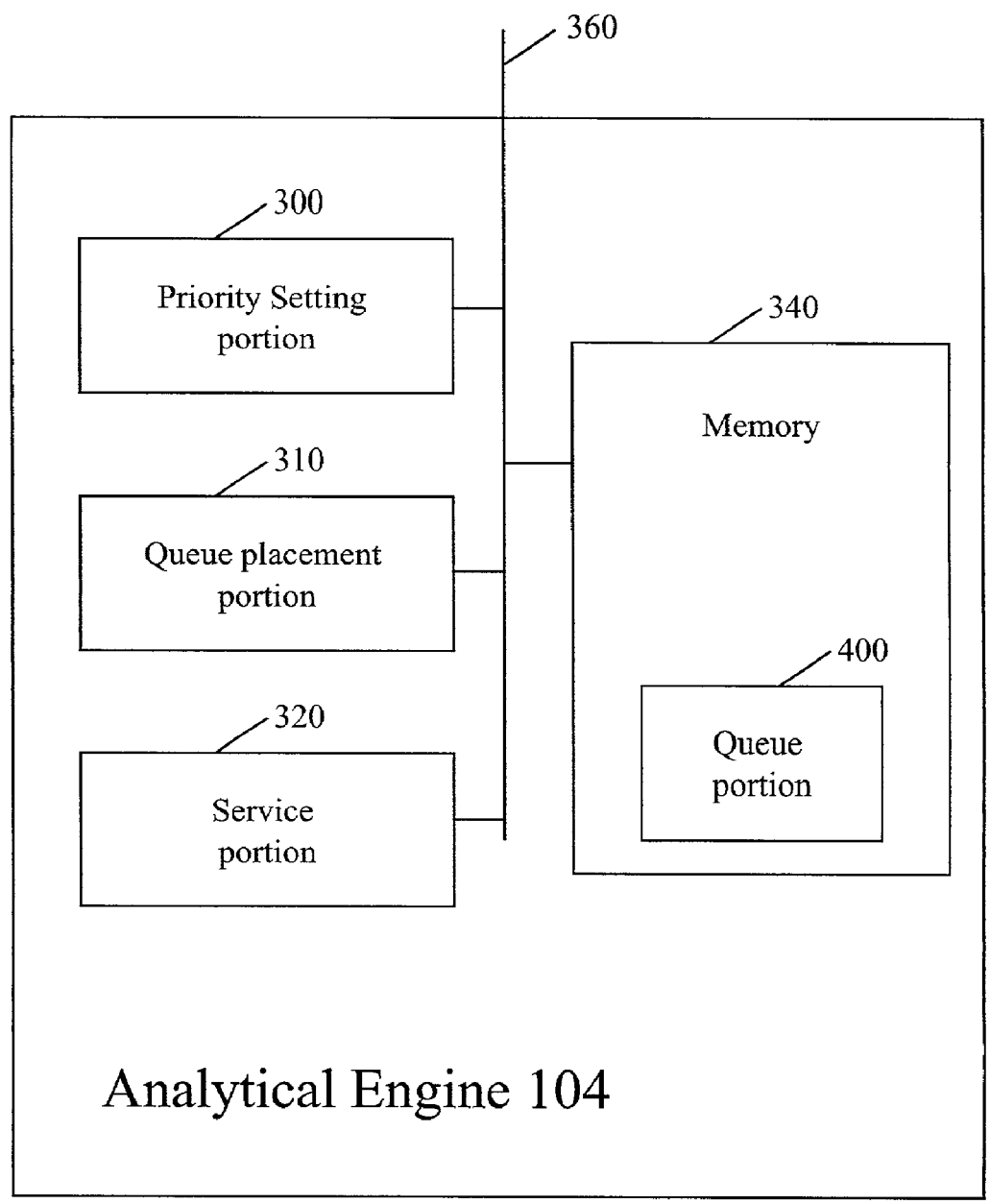
FIG. 3 is a block diagram showing the analytical engine in further detail according to an embodiment of the invention.

FIG. 3 is a block diagram illustrating an architecture for the analytical engine 104 according to an embodiment of the invention. As shown in FIG. 3, the analytical engine 104 includes a priority setting portion 300, a queue placement portion 310, and a service portion 320. The priority setting portion 300 interfaces with the user engine 102, for example, in order to assign priorities to the various individual jobs. The queue placement portion 310 places jobs in a particular queue based on the priority assigned to that job. Further, the service portion 320 performs the dequeuing and service of jobs based on the assigned priorities. It should be appreciated, and as will be discussed below, the analytical engine 104, in accordance with one embodiment, functions so as not to restrict a system administrator's ability to control the flow of job execution. The analytical engine 104 also provides several methods for determining both job priorities and controlling job servicing.

The analytical engine 104 also includes a memory 340. As described below, the memory 340 stores various data related to operations of the priority setting portion 300 and the service portion 320. The memory 340 also includes a queue portion 400. The queue portion 400 stores data representing pending jobs and the disposition of those jobs within queues. The priority setting portion 300, the queue placement portion 310, the service portion 320 and the memory 340 may be connected by a suitable interface 360.

Hereinafter, various aspects relating to operations of the priority setting portion 300, the queue placement portion 310, and the service portion 320 will be described. As used herein, a "job" may include, but is not limited to, any of a wide variety of requests from users requiring processing by a reporting system, including but not limited to, a report request (e.g. a single OLAP question); a document request, where a document is essentially a set of multiple reports; or an element browse request, where "browsing elements" is essentially scanning through records in a database table, for example. As used herein, a "thread" may be characterized as an entity that provides services to jobs. Illustratively, a thread may represent a processing system that processes jobs in sequence. Further, "prioritization" may be characterized herein as assigning a relative job priority to a job. Further, "servicing" may be characterized as selecting the next job to be serviced based on a set of priority queues and an available thread. In other words, the next available thread, i.e., a processing unit, performs the next job based on the priorities. It should be appreciated that the prioritization and servicing of jobs using threads, or other suitable processing units, could be utilized in any of a variety of environments in which jobs are prioritized prior to processing.

As described in further detail below, it should be appreciated that the priority provided to a given job may vary depending on a variety of factors as is desired. In accordance with the systems and methods of the invention, the priority of a particular job may be based on user identification, i.e., which user requested the particular job, for example. That is, the priority setting portion 300 is provided with the ability to prioritize jobs based on user identification. Further, jobs may be prioritized based on estimated time, and/or cost. Priority may also be based on project, including where a project is an application domain, such as finance or marketing, i.e., marketing jobs could be prioritized ahead of finance jobs. Further, priority may be based on Report Type, where Report Type indicates if the report is an initial question or a follow-up question to a previous question. For example, follow-up questions could be prioritized ahead of initial questions.

In further explanation of the systems and methods of the invention, prioritizing based on user identification may include individuals (user names) or roles (all Vice Presidents, regional sales managers, etc. for example) or other identifications.

It should be appreciated that the priority of a job may be based on a wide variety of factors. For example, priority may be based on whether the report is requested by an individual or is a scheduled report intended to go to a group of users or an alert. Further, if a report, for example, is going to a group of persons, the number of people in the group and/or the roles of the people in the group may be taken into account in the priority. Further, a priority scheme may be established in which scheduled jobs take priority over requested jobs at night, but scheduled jobs do not take priority over requested jobs during the day.

In accordance with one embodiment of the systems and methods of the invention, system administrators may be able to override priority and servicing schemes by manually changing the priority of a job in a queue. That is, the priority setting portion 300 provides the ability to alter a job priority once it is entered into a queue. Accordingly, this feature provides an administrator flexibility when job completion priorities vary from the routine.

In accordance with one embodiment of the systems and methods of the invention, the priority of a particular job may be set automatically based on predefined formulas. These formulas can be based on any data, i.e., any variable, available to the system 100. Alternatively, the formulas for prioritization may be based on a user-defined function, for example.

In accordance with a further aspect of one embodiment of the invention, it should be appreciated that a priority of a job may be based on the particular user requesting the job, as described above. Relatedly, a "fair share" technique may be utilized in some embodiments of the invention. In the fair share technique, each additional job in a queue from a particular user is assigned a progressively lower priority. That is, the first job is priority one, the second priority two, and so forth. By utilizing a type of fair share technique, each user has a "fair" access to the processing capabilities of the system 100. Once a job is done executing, all of the users' other jobs may then be "bumped" up in priority by the priority setting portion 300 based on output from the service portion 320 that a job was completed.

It should be appreciated that one goal of the analytical engine 104 is to prioritize and service jobs in such a manner as to ensure efficient usage of resources. There may, of course, be a variety of resources available to the analytical engine 104. For example, a relational database manager server (RDBMS) that services warehouse queries may be utilized as a processing resource. Additionally, a RDBMS that services metadata queries may be utilized. Further, any number of analytical processing engines may be utilized. To explain further, the analytical engine 104, including the priority setting portion 300 and the service portion 320, provides the ability to strike a balance between two or more goals, as is desired, through establishing a priority technique and a job servicing technique.

In accordance with one embodiment of the systems and methods of the invention, one goal is to optimize total system throughput. Another goal is to optimize individual query response. It should be appreciated that high throughput ensures that the processing system being utilized to complete the various jobs experiences stable, full utilization; and that as many report requests as possible are fulfilled in as short a time as possible. At the same time, however, it should be appreciated that users, i.e., customers for example, want to ensure that some sense of "fair share" is granted to all the various jobs that require the system resources. Accordingly, it should be appreciated that the systems and methods of the invention allow a balance to be attained between these and other goals, as desired. Accordingly, goals which may be taken into account include system throughput, more quickly processing more urgent or important reports, and if desired "fair share," for example.

For purposes of illustration, the following examples are included in accordance with embodiments of the methods and systems of the invention. The examples show different schemes that may be put into place to prioritize jobs.

EXAMPLE 1

Company A

There are two projects: Production project, Training project. There are also two user groups: Production users, Training users. The priority function: any job from the Production project is higher priority than Training project. The total number of queues: Two, one for Production project, one for Training project. The job servicing issues includes needs to avoid job starvation; and the Training project needs to get some access to the database.

EXAMPLE 2

Company B

There are two projects: Sales project, Operations project. Also, there are three user groups: Sales managers, Operations managers, VP of Operations. The priority function includes jobs in the Sales project from sales managers receive high priority, as do jobs in the Operations project from operations managers; jobs in the Sales project from operations managers and jobs in the Operations project from sales managers receive low priority; and jobs from the VP of Operations in either project receive highest priority. Further, the total number of queues: Three, one for Sales project-Sales managers and Operations project-Operations managers, one for Sales project-Operations managers and Operations project-Sales managers, and one for VP of Operations.

As should be appreciated by the above examples, a variety of priority schemes may be used in accordance with embodiments of the methods and systems of the invention. For example, a default scheme may be used in which all jobs are processed on a first in, first out basis. Further, a simple "priority by report cost" scheme may be used in which jobs are prioritized solely by estimated report cost. Further, a simple "priority by user" scheme may be used in which jobs are prioritized solely based on the user who submitted the job. Also, a simple "priority by project" scheme may be employed in which jobs are prioritized solely based on the project where the job comes from.

As described above, a job is submitted to the analytical engine 104 through a user using the user engine 102, for example. Once this job is submitted to the analytical engine 104, the priority setting portion 300 establishes a priority of the submitted job. Prioritization may be characterized as the assignment of a relative priority to each job that is submitted to the engine 104. In accordance with one embodiment, this assignment of priority may be based upon a priority function that determines a priority value, given a set of relevant priority variables. Accordingly, when the system administrator defines a priority scheme, he or she is simply selecting the relevant priority variables and specifying a priority function in accordance with one embodiment of the systems and methods of the invention. Illustratively, priority for an individual job may be assigned based on three priority variables. These three priority variables include project type, user, and cost. Other variables may also be used as desired.

A job may be prioritized based on the nature of the project. Utilizing this variable, jobs from different projects will have different priority values and all jobs within a project will contain the same priority value, i.e., assuming that no other variables are factored into the prioritization. Accordingly, for example, all jobs in project A may have a higher priority than all jobs from project B.

Priority may also be based on the user, i.e., the human person who submitted the job or the calling application acting as a user. All jobs submitted by the same user may thus have the same priority value, assuming no additional variables are factored into the prioritization. Accordingly, for example, all jobs from user A have a higher priority than jobs from user B. However, it should of course be appreciated that priority of a job may likely not be based on a particular project or user, but rather may be based on multiple factors.

Illustratively, users may have a different relative priority based on the particular project that a particular user is submitting. Thus, if an accountant submits a job related to accounting or the accounting data, that job may have a higher priority than the same human accountant submitting a job related to marketing or the marketing data. It should thus be appreciated that in some circumstances it may be difficult to assign a single priority value to a particular user. Rather, priority may be assigned to a job based on a combination of user, project, as well as other factors as is desired.

Further, in accordance with one embodiment of the systems and methods of the invention, priority may be based on user groups, rather than individual users. This technique serves as a time-saver to system administrators. If a system administrator deems that an individual user does indeed need a separate priority since a set of users should all have the same priority, then the systems and methods of the invention allows the administrator to create a user group and include that user as well as others.

Illustratively, a further priority value which may be used to assign priorities to individual jobs, is a cost parameter. For example, the engine 104 may be preparing a report. Accordingly, the cost parameter is a report cost. Submitted jobs may be prioritized based on an estimated cost value for the report. Cost is a general variable that can represent several different characteristics of the job. For example, report cost can include such parameters as a report priority, report type, historical report cost, and estimated or predicted report cost. Each of these characteristics is dictated by the nature of the report. In this illustrative example relating to report costs, it should be appreciated that a variety of other parameters or characteristics may be utilized as is desired.

In further explanation of the report costs example, the "report priority" is a fixed priority for a given report. Thus, a system designer may assign a priority value to specific reports. This allows the system designer to specify certain reports that always receive special priority. Alternatively, reports that always receive low priority may be accorded a suitable report priority ranking.

Related to report priority, a further characteristic may be "report type." This property of a job indicates if the job was generated as a new report, as a data surf, or as a drill-down, for example. This characteristic allows the system designer to give higher priority to more "interactive" jobs, such as drill-downs and data surfs, for example. For example, a report created via a drill-down may have a higher priority than a standard report, or stated differently, a secondary or derived report may have a higher priority than a new report. In accordance with this illustrative embodiment, that the drill-down report might be created for follow-up analysis and should be returned to the user as quickly as possible.

A further characteristic in accordance with this illustrative example is "historical report costs." This characteristic reflects an estimate of the complexity of the report based upon an historical record of executing the report in the past. The historical report costs may be established when the job is submitted based upon an historical record of running the same report.

A further characteristic is "estimated report costs." This characteristic is an estimate of the complexity of the report based upon the analytical engine's 104 knowledge of the query that it generates as well as any other means of generating a predicted cost. In accordance with this technique, the priority setting portion 300 will first determine the estimated cost for a report and then assign it a priority.

In accordance with one embodiment of the system method of the invention, "priority variables" may be utilized in a "priority function". The particular variables utilized, as well as the priority function, will of course depend on the particular implementation of the method of the invention. A priority function defines a priority value based on the set of priority variables factored into the priority function. The priority variables and functions, which are utilized to determine the priority value of a given job, may vary as is desired. Once a priority value is determined, then that priority value allows the priority setting portion 300 to place a particular job in a queue set or queue.

It should be appreciated that three priority variables are described herein including project, user and cost. Further, the cost variable, for example, is used to represent multiple report characteristics including the estimated cost, and historical cost, for example. However, rather than using cost to generalize multiple report characteristics, each characteristic could be represented as another priority variable in accordance with one embodiment of the systems and methods of the invention. That is, priority functions could be implemented as mappings of project, user, report, job type, historical cost, and estimated cost to result in a priority value, for example. This approach would eliminate the need to define a report cost function as something separate from a priority function. However, it may allow the number of input combinations to the priority function to grow very quickly. Accordingly, and as noted above, it should be appreciated that both the priority variables as well as the priority formulas or functions, utilized to produce a priority value based on the priority variables, may vary. It should be appreciated that priority functions may be site-specific, meaning that each customer, for example, will define the priority formula to meet their needs. Examples include the following, where (Project, User, Report, Type, Historical Cost, Estimated Cost) represents one or more combinations of the seven priority variables:

(any, User CEO, any, Drill-down report, any, any)→Priority 1;

(any, User CEO, any, Normal report, any, any)→Priority 2;

(any, any other User, any, Drill-down report, any, any)→Priority 3;

(any, any other User, any, Normal report, any, any)→Priority 4;

(Accounting Project, Accounting Manager, any, any, any, any)→Priority 1;

(Marketing Project, Marketing Manager, any, any, any, any)→Priority 1;

(Marketing Project, Accounting Manager, any, any, any, any)→Priority 2;

(Accounting Project, Marketing Manager, any, any, any, any)→Priority 2;

(Marketing Project, any other user, any, any, any, any)→Priority 3; or (Accounting Project, any other user, any, any, any, any)→Priority 3.

Figure 4:
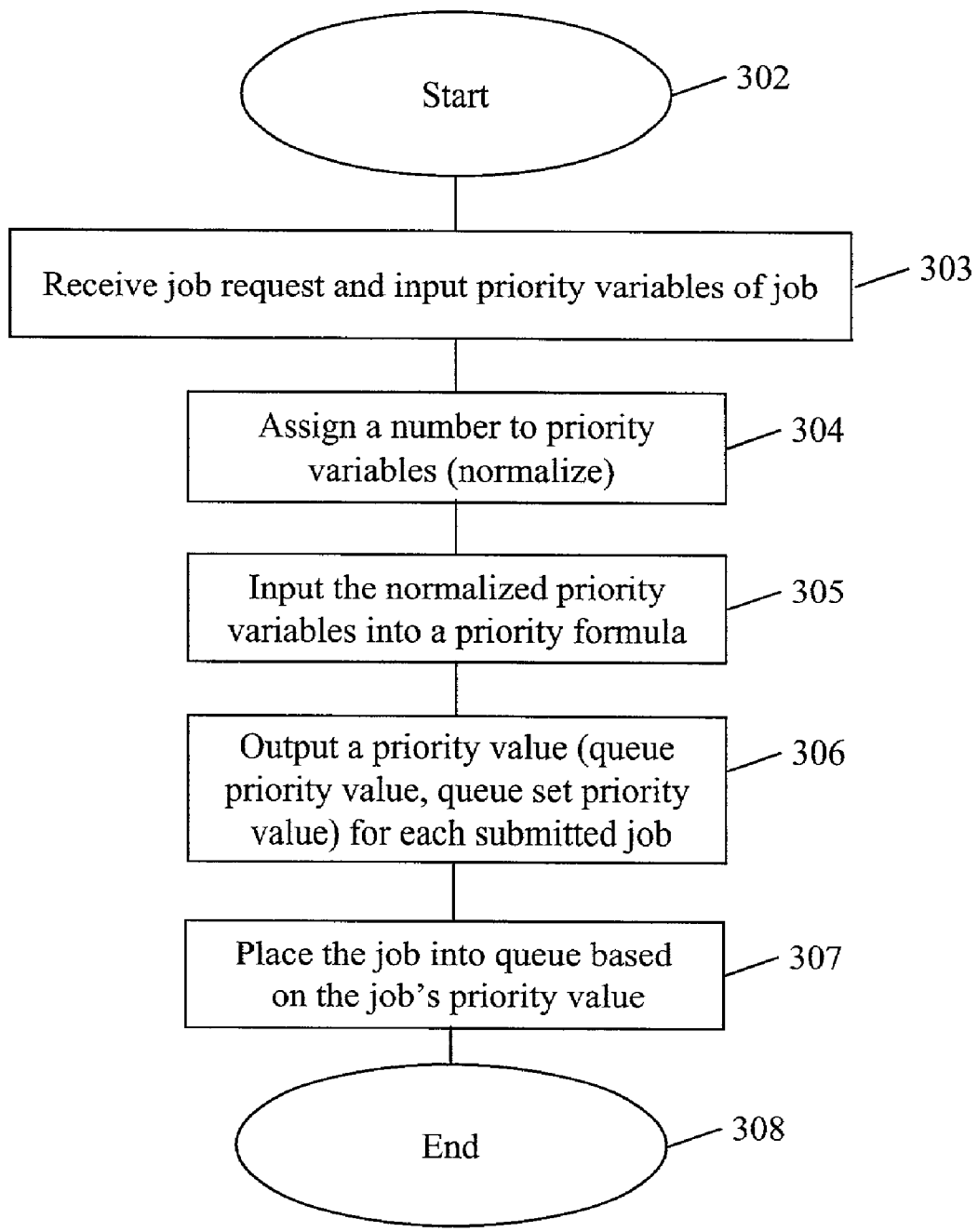
FIG. 4 is a flowchart showing a process of assigning priorities to and servicing jobs according to an embodiment of the invention.

FIG. 4 is a flowchart showing operation of the priority setting portion 300. As shown in FIG. 4, the process starts in step 302. Then, the process passes to step 303. In step 303, the job request is received and the priority setting portion 300, for example, inputs the priority variables of the job. Then, in step 304, a number is assigned to the priority variables, i.e., the priority variables are normalized as is described in further detail below. Then, the process passes to step 305.

In step 305, the normalized priority variables are input into a priority formula. Then, in step 306, a priority value is output for each submitted job. As described below, the priority value may include a queue priority value and/or a queue set priority value. After step 306, the process passes to step 307. In step 307, the job is placed into a queue based on the job's priority value. Then, the process passes to step 308. In step 308, the process ends.

In accordance with one embodiment of the systems and methods of the invention and as noted above, the priority variables, which are utilized in the priority formula, may be normalized. This normalization may provide a weighting affect and/or may allow a "type" variable, for example, to be translated into a numerical value.

Illustratively, with further reference to the report cost value example described above, the report priority is a property of a report definition, such as an integer value between 0 and 100. This value can be directly assigned to a job as a report cost by the requesting user. Further, the "report type" is a property of the job. A priority variable may be assigned to a job based on mapping of particular report types to report cost values, for example. Thus, perhaps a drill-down report maps to a report cost value of 40. Further, an historical cost can be assigned to a job based on a historical cost table. The historical cost may also be normalized to a standard scale. Further, the estimated cost as described above may be normalized in a suitable manner, such as in the same manner as the historical cost. It should be appreciated, this framework allows for report cost functions to be defined as arithmetic functions.

As described above, various priority variables may be utilized in a priority function. The priority variables may be normalized as is desired. In turn, the priority function maps the different combinations of priority variables to a unique priority value. Accordingly, each job that is submitted to the engine 104 is assigned a priority value based upon the job's corresponding project, user, and cost in accordance with one embodiment of the systems and methods of the invention.

Once the priority setting portion 300 establishes a priority value of a submitted job, this priority information is then stored in the memory 340 in any suitable manner. Subsequent to the priority value being assigned, the queue placement portion 310 initiates operation with respect to that particular job for which the priority value was determined. Of course, it should be appreciated, that operations of the priority setting portion 300, the queue placement portion 310 and the service portion 320 are continuous in that jobs are continually being submitted, prioritized, queued and serviced, i.e., performed.

In accordance with embodiments of the systems and methods of the invention, a job is placed in a particular queue based on the job priority value. To explain further, the queue placement portion 310 utilizes a hierarchical queue structure that includes both queues and queue sets in accordance with one embodiment. As a result, in accordance with an embodiment of the method and system of the invention, each job may have two priority values, i.e., a "queue set priority value" and a "queue priority value." The queue set priority value determines which queue set the job is placed into. Further, the queue priority value determines which queue, within a particular queue set, the job is placed. Further details of both the queue set and queue are described below.

In accordance with further aspects of the invention, other priority values may be used which relate to various aspects of a job. For example, a priority value may be provided for "where a job should be" in a particular queue relative to another job in that queue. Further, it should be appreciated that one or more types of priority values can be assigned to a job. For example, a job may be assigned one or more of a queue set priority value, a queue priority value, a relative priority value (within a queue), and other priority values, for example.

Figure 5:
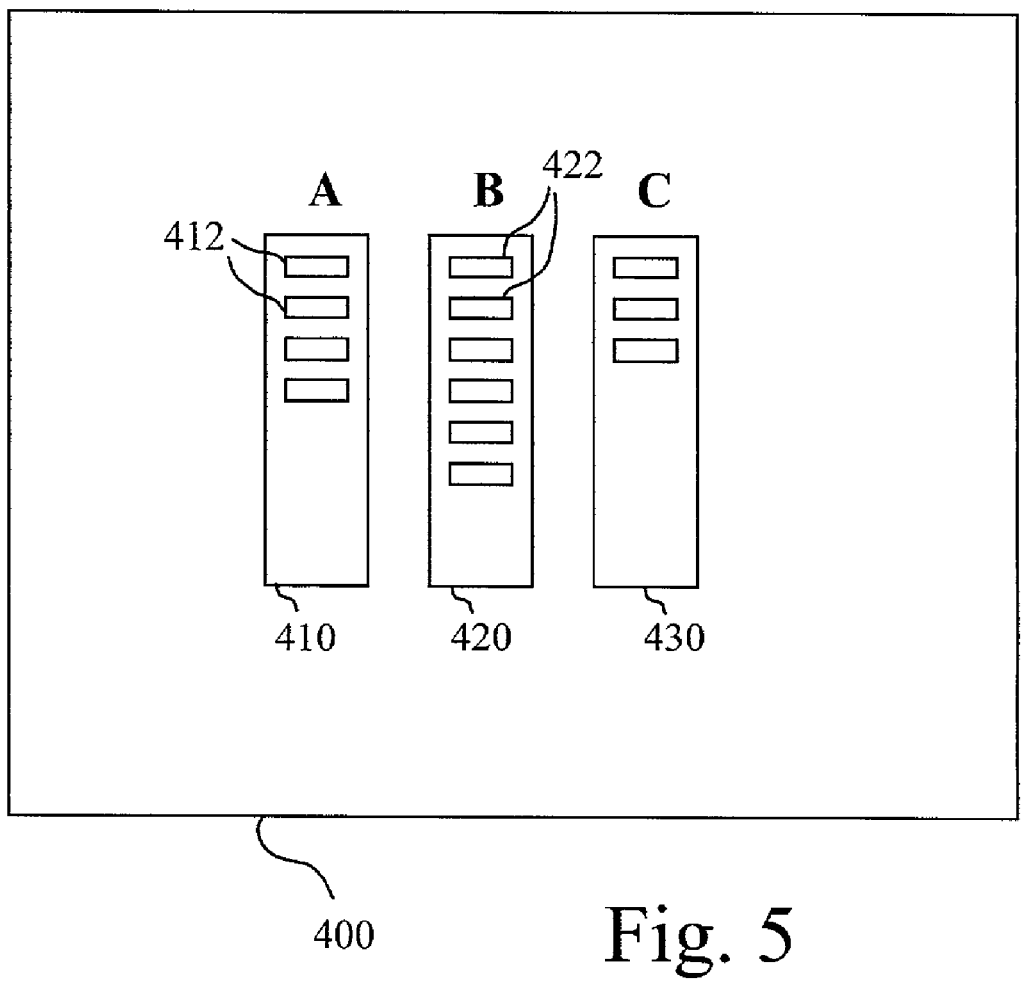
FIG. 5 is a block diagram showing the queue portion 400 in further detail according to an embodiment of the invention.

As described above, the memory 340 includes a queue portion 400. Once a priority value or priority values are determined for a particular job, this priority value information, as well as the particulars of the job, are stored in the queue portion 400. FIG. 5 is a block diagram illustrating further aspects of the queue portion 400.

FIG. 5 is a block diagram showing in further detail the queue portion 400 in accordance with one embodiment of the method and system of the invention. As shown in FIG. 5, the queue portion 400 includes a plurality of queue sets. Specifically, the queue portion 400 includes a queue set A 410, a queue set B 420 and a queue set C 430.

As shown in FIG. 5, the queue set A 410 contains a plurality of jobs 412. In a similar manner, the queue set B 420 contains a plurality of jobs 422. The queue set C 430 also contains jobs. In accordance with one embodiment of the systems and methods of the invention, each queue set (410, 420, 430) has a priority range associated with that particular queue set. The range, as well as the queue set/queue structure, is defined by a system administrator, or other suitable person, for example. For example, queue set A may have a priority range 1-5; queue set B may have a priority range 6-30; and queue set C may have a priority range 31-100. Such priority ranges may be utilized when priority values of respective jobs vary from 0 to 100. Accordingly, jobs are inserted into a particular queue set (410, 420, 430) based on the priority value of the particular job. Thus, if a job has a priority of between 1 and 5, then that particular job will be inserted into queue set A 410. Alternatively, if a particular job possesses a priority value of 27, for example, that particular job will be inserted into queue set B 420.

In accordance with one embodiment of the systems and methods of the invention, all jobs within a particular queue are treated with equal priority. Consequently, a job with a priority value 1 receives the same processing priority by the service portion 320 as a job with a priority value of 2, 3, 4 or 5. Further, jobs may be inserted into the end of each queue. This provides for a first in-first out (FIFO) processing of the jobs in a particular queue. However, it should be appreciated that all jobs within a particular queue do not have to have the same priority. Rather, one or more jobs may have a different priority, as is desired.

Figure 6:
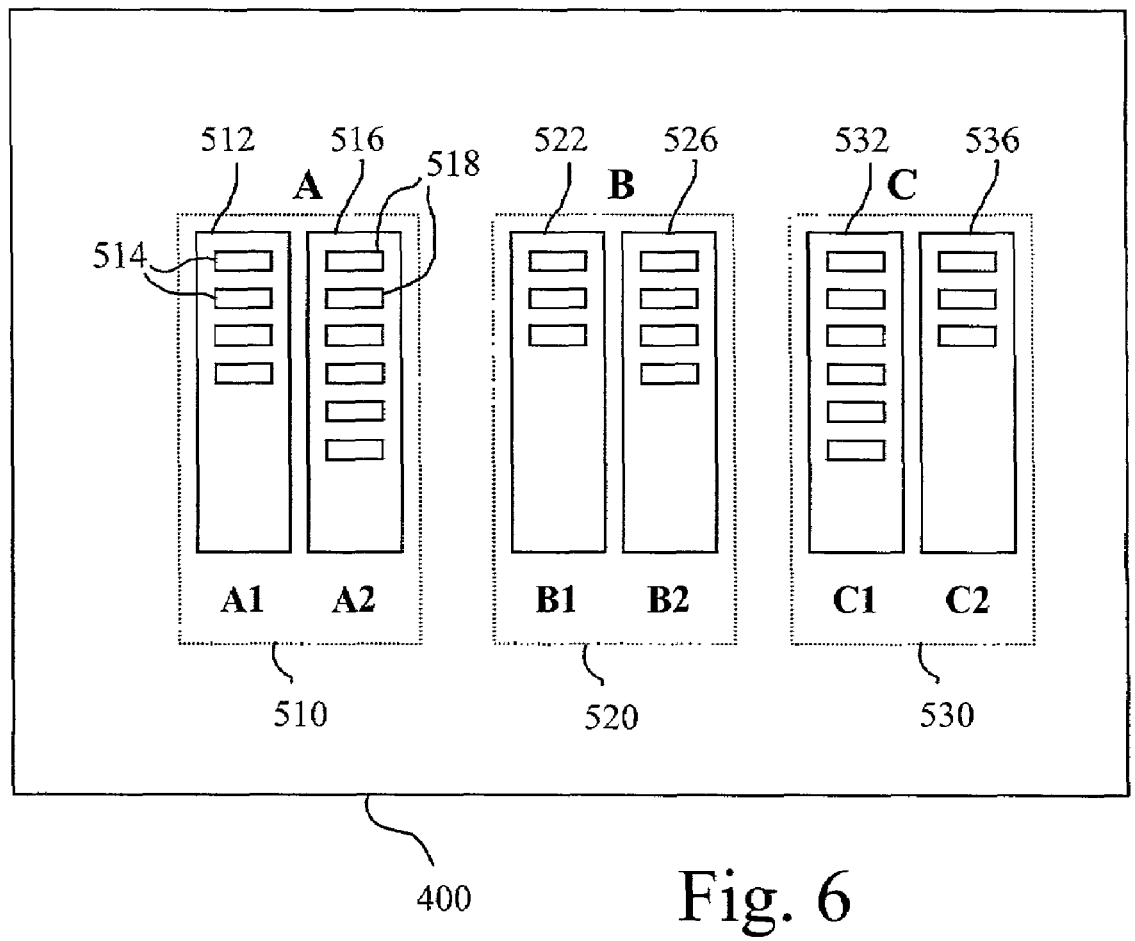
FIG. 6 is a block diagram showing the queue portion 400 in further detail according to a further embodiment of the invention.

In accordance with a further embodiment of the systems and methods of the invention, multiple queues may be defined within each queue set. For example, this arrangement of each queue set may be performed by an administrator or other suitable person. When utilizing a queue within a queue set, each job may possess two levels of priority values, as is described above. The first priority value is to define the queue set, and the second priority value is to determine a particular queue within that queue set. FIG. 6 is a diagram in accordance with a further embodiment of the queue portion 400.

As shown in FIG. 6, the queue portion 400 includes queue set 510, queue set 520 and queue set 530. The queue set 510 includes queue A1 510 and queue A2 516. The queue A1 512 contains various jobs 514. Similarly, the queue A2 516 contains jobs 518.

The queue sets 520 and 530, as shown in FIG. 6, also contain multiple queues as well as jobs within those queues. Specifically, queue set 520 contains queue B1 522 and queue B2 526. Each of the queue B1 522 and the queue B2 526 contains jobs. Further, the queue set 530 contains queue C1 532 and queue C2 536, each of which contain jobs.

In accordance with one embodiment of the method and system of the invention, jobs may be placed into the various queue sets and queues depending on the priority value or values of a particular job. Any of a wide variety of priority schemes may be utilized to place the jobs in the various queue sets and queues. For example, Table 1 below shows an illustrative priority scheme.

TABLE 1

| QS Priority Range | Queue Set | Queue Priority Range | Queue |
|---|---|---|---|
| 1-5 | A | 1-2 | A1 |
| 1-5 | A | 3-5 | A2 |
| 6-30 | B | 6-20 | B1 |
| 6-30 | B | 21-30 | B2 |
| 31-100 | C | 31-60 | C1 |
| 31-100 | C | 61-100 | C2 |

A job with a queue set priority between 1 and 5 will be assigned to queue set A. Further, a queue set (QS) priority range of 6-30 results in the queue placement portion 310 placing a job in the queue set B 520. Further, a QS priority range of 31-100 results in the queue placement portion 310 placing a job in the queue set C 530.

Further, Table 1 also shows queue priority ranges, as opposed to queue set priority ranges. For example, a queue priority range of 1-2 results in a job being placed in the queue A1 510. Further, a queue priority range of 6-20 results in a job being placed in the queue B1 522. As shown in Table 1, the queue priority range may vary between 1-100.

As shown in Table 1, the queue priority range uniquely identifies which queue a particular job is placed based on the priority value of that queue. Since the queue priority range uniquely determines which queue a job is placed, it should be appreciated that the queue priority range may be utilized by itself, to not only control which queue, but also which queue set. Accordingly, it should be appreciated that a variety of priority schemes, both relating to queue set priority values, queue priority values, or both may be utilized to place a particular job in a particular queue set and queue.

As described above with reference to FIG. 5, in accordance with one embodiment of the invention, jobs placed by the queue placement portion 310 into the same queue are treated equally. For example, each new job placed within a particular queue is inserted into the end of that queue. Consequently, a job with a priority value of 1 receives the same processing priority as a job with a priority value of 2.

It should be appreciated that queue set priority and queue priority may be the same value or two different values. With reference to Table 1 above, as described, the range used to divide jobs into different queues is simply a further refinement of the ranges used due to find queue sets. This may be the case but does not necessarily have to be. That is, a second priority value may be used with different range values to place jobs into queues. However, a job may preferably be assigned a queue set, in accordance with some embodiments of the invention, prior to being inserted into a queue within that queue set. Additionally, it is possible to define a configuration with only one queue set and multiple queues within that set.

As described above, priority functions may be used to map various priority variables to a priority value. It should be appreciated that when the number of combinations of priority variables, such as project, user, and cost, is small, then it is relatively simple to explicitly define a mapping table for each combination. However, when the number of combinations is large, it becomes more difficult to define the mapping explicitly. Rather, it should be appreciated that it may be easier to normalize the priority variables into numerical values and define an arithmetic function which, based on input of priority variables, will output a priority value.

In accordance with one embodiment of the systems and methods of the invention, priority functions may be defined at the queue structure level. Regardless of whether the implementation is in arithmetic calculation, or alternatively, some sort of mapping, the definition of the function may be assigned to a queue structure. Priority functions are evaluated by the priority setting portion 300 and the resulting value is used to assign the job to a queue. It should be appreciated that report cost functions should be defined at the same level as priority functions.

It should be appreciated that a job may need to be assigned to a queue before all the priority variables to the priority functions are known. For example, a job may be placed into a queue before the job has been assigned an estimated cost. In this situation, a default value may be assigned to the missing priority variable. The missing priority variable may be updated once the information is known, assuming the job has not already been processed.

Hereinafter, further aspects of the systems and methods of the invention will be described with reference to operation of the service portion 320. Specifically, aspects of the invention relating to job servicing will be described below. In accordance with one embodiment of the systems and methods of the invention, the service portion 320, given a set of prioritized queues, determines the order in which jobs are dequeued or serviced. Various methods may be utilized to service the queued jobs. Specifically, the service portion 320 may utilize a first in first out technique, a fixed thread-selfish technique, a fixed-thread cooperative technique, a highest priority first technique or alternatively, a weighted share technique, or any other suitable technique. As described below, the various methods are discussed in terms of queues and/or queue sets.

The service portion 320 may utilize a first in first out technique. Using this technique, the service portion 320 dequeues and services jobs in the order in which the jobs entered the queue. When this method is used and only one queue exists, jobs are prioritized based only on their time of submittal. Accordingly, the first in first out technique is not effected by how many threads are used for job servicing. In accordance with one embodiment of the systems and methods of the invention, this method is used to process jobs, within a queue, regardless of how jobs across queues are serviced. FIG. 7 is a diagram illustrating the first in first out technique. As shown in FIG. 7, the queue A1 512 contains a plurality of jobs 514. As shown in FIG. 7, the first job in, is the first job out, utilizing the first in first out technique.

In accordance with a further embodiment of the invention, the service portion 320 may use a fixed thread-selfish technique. In this technique, each queue is assigned a certain number of threads. Those threads are dedicated to that particular queue and cannot service jobs outside of that queue. As shown in FIG. 8, queue A1 512 has one dedicated thread T1 and queue A2 516 has two dedicated threads (T2 and T3). Accordingly, even if queue A1 512 is full and queue A2 516 is empty, the threads T2 and T3 will not service jobs from queue A1 but will wait idle until a job enters queue A2. This technique ensures that jobs in each queue are serviced at constant levels and not effected by the activity of other queues. However, it should be appreciated that utilizing this technique, threads are not polled, i.e., utilized, efficiently and may sit idle while other queues are full.

Figure 9:
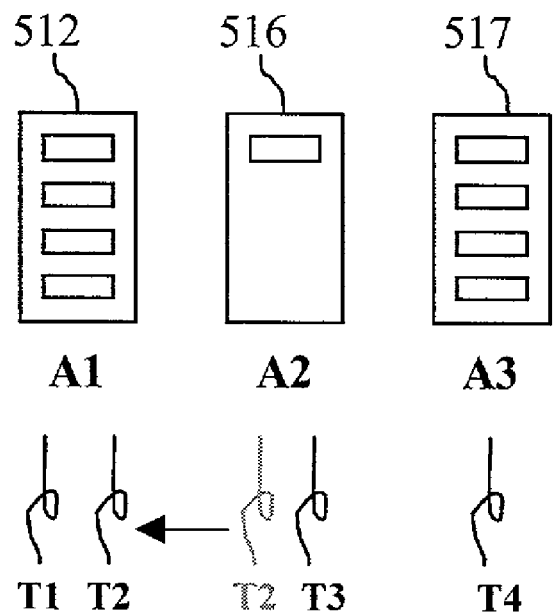
FIG. 9 is a diagram showing multiple queues and illustrating a fixed thread-cooperative technique according to an embodiment of the invention.

A third job servicing technique is a fixed thread-cooperative technique. In a fixed thread-cooperative technique, each queue set is assigned a certain number of threads. If a thread is idle and there are no jobs in need of processing in the queue set, the thread may switch to another queue set. As a result, the thread will be on temporary loan, so to say, to the second queue set and will check for jobs in the primary queue set after servicing each job in the secondary set. FIG. 9 is a diagram illustrating the fixed thread-cooperative technique. As shown in FIG. 9, the thread T2 is on loan to the queue A1 512. Since there are no pending jobs in the queue A2 516, it should be appreciated that if T2 did not switch to queue A1 512, the thread T2 would sit idle. After each job T2 processes in queue A1 512, the thread T2 first checks to see if new jobs have entered queue A2 516. If so, then the thread T2 switches back to its original queue A2 516.

In configurations with more than two queues, it should be appreciated that threads may switch to more than a single queue. For example, threads may move in a serial fashion from one queue to the next based on a defined priority for the queues. This priority is different than job priority. As shown in FIG. 9, for example, queue A1 512 may be the highest priority queue followed by A2 with A3 having the lowest priority. With this priority scheme, threads may move from A2 to A1, but not to queue A3. As a result, this arrangement allows limited cooperation. If queues are not prioritized, threads from empty queues should switch to busy queues using a round robin scheme, for example. With further reference to FIG. 9, for example, thread T2 will service a job from queue A1 512, and then service a job from queue A3 517. However, it should be appreciated that threads are not limited to moving in serial fashion. Rather, threads may move in any of a number of ways, including in a serial fashion.

Figure 10:
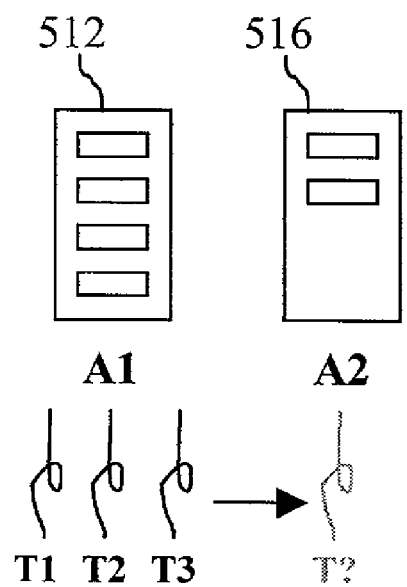
FIG. 10 is a diagram showing multiple queues and illustrating a highest priority first technique according to an embodiment of the invention.

In accordance with a further embodiment of the systems and methods of the invention, the service portion 320 may utilize a highest priority first technique to process the queued jobs. In the highest priority first technique, the service portion 320 services each queue set in serial fashion based on priority. That is, all available threads service jobs in the highest priority queue set first. Accordingly, none of the threads are allocated to any particular queue set. One shortcoming of the highest priority first technique is that lower levels queues may rarely be serviced. FIG. 10 shows aspects relating to the highest priority first technique. As shown in FIG. 10, the queue A1 512 may be defined as having a higher priority than the queue A2 516. Further, threads T1, T2 and T3 are not assigned to either queue (512, 516) but will always attempt to service jobs in queue A1 512 prior to servicing jobs in queue A2 516 utilizing the highest priority first technique.

Figure 11:
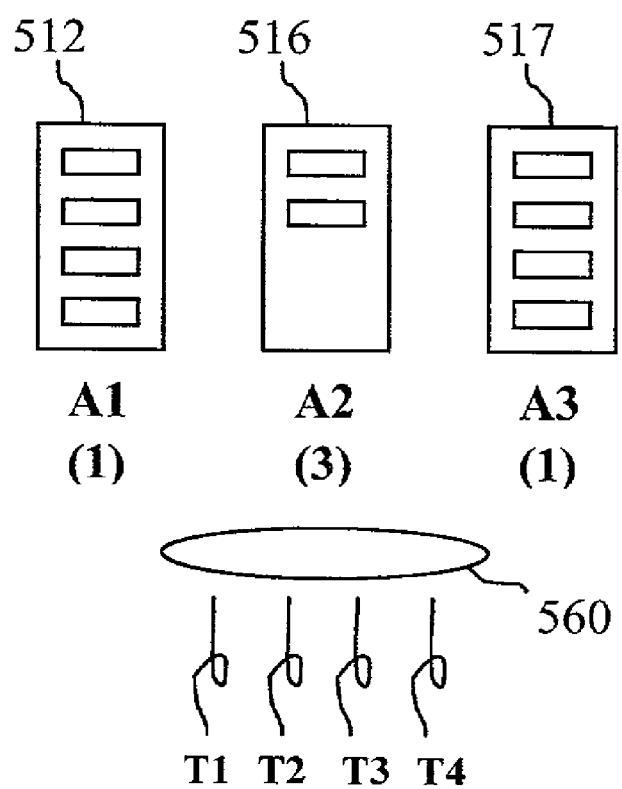
FIG. 11 is a diagram showing multiple queues and a thread pool illustrating a weighted share technique according to an embodiment of the invention.

In accordance with a further embodiment of the systems and methods of the invention, the service portion 320 may utilize a weighted share technique. In using the weighted share technique, each queue has a weighting factor. Threads are not assigned to any one queue but are shared among all queues. The weighting factor allows a queue to receive higher service levels relative to other queues. To explain with reference to FIG. 11, for example, queue A1 512, queue A2 516, and queue A3 517, have weights of 1, 3 and 1, respectively. Further, there are four threads allocated to service all of the queues. Using the weighted share technique, thread T1 will service one job in queue A1. Threads T2, T3, and T4 will service a total of three jobs in queue A2 516. Thereafter, the first thread to finish processing will service one job in queue A3 517. The next thread to finish processing will service one job in queue A1 512. Thereafter, three jobs from queue A2 516 are processed all by one job from queue A3 517. This cycle continues, always processing jobs in a cyclical manner and with respect to the relative weighting factors. Further, this method ensures that all threads are always busy as long as pending jobs exist. As shown in FIG. 11, the threads T1, T2, T3 and T4 may be pulled from a thread pool 560.

Hereinafter, further aspects of servicing of queue sets and queues will be described in accordance with embodiments of the systems and methods of the invention. Specifically, it should be appreciated that various "governors" may be utilized by the service portion 320 in processing of jobs. In accordance with one embodiment, the service portion 320 honors all governors, which are in place. For example, one governor may limit the number of jobs any one user may have concurrently executing. This governor, in accordance with one embodiment, holds true whether the jobs exist within one queue, multiple queues, or across queue sets. Accordingly, when this limit is reached, the service portion 320 attempts to process the next job in the current queue instead of treating the job as processed and skipping to the next queue based on the servicing method.

It should be appreciated that when using queue sets, a designer has the ability to utilize servicing methods in combination. That is, one service method may be used at the queue set level and another at the queue level. The following chart lists possible combinations of methods. It should be noted that first in first out is only used within a queue and would not be defined as a method across queues or queue sets, in accordance with one embodiment of the method and system of the invention.

TABLE 2

| Queue Set Method | Queue Method | Description |
|---|---|---|
| Fixed Thread (Selfish) | Fixed Thread (Selfish) | Threads are dedicated to only specific, multi level priority groups. |
| Fixed Thread (Selfish) | Fixed Thread (Cooperative) | Threads are dedicated to queue sets and cannot service other queue sets. Within each queue set, threads are divided among various queues and can be loaned to other queues. |
| Fixed Thread (Selfish) | Highest Level First | Threads are dedicated to queue sets and cannot service other queue sets. Within each queue set, threads will process jobs from the highest priority queue first. |
| Fixed Thread (Selfish) | Weighted Share | Threads are dedicated to queue sets and cannot service other queue sets. Within each queue set, threads are pooled and process jobs based on the defined queue weights. |
| Fixed Thread (Cooperative) | Fixed Thread (Cooperative) | Threads are dedicated to queue sets but may be loaned to other queue sets during idle times. Within each queue set, threads are dedicated to queues but may be loaned to other queues during idle times. |
| Fixed Thread (Cooperative) | Highest Level First | Threads are dedicated to queue sets but may be loaned to other queue sets during idle times. Within each queue set, threads will process jobs from the highest priority queue first. |
| Fixed Thread (Cooperative) | Weighted Share | Threads are dedicated to queue sets but may be loaned to other queue sets during idle times. Within each queue set, threads are pooled and process jobs based on the defined queue weights. |
| Weighted Share | Highest Level First | Threads are pooled across all queue sets and process jobs based on the defined queue set weights. Within each queue set threads will process jobs from the highest priority queue first. |

TABLE 2-continued

| Queue Set Method | Queue Method | Description |
|---|---|---|
| Weighted Share | Weighted Share | Threads are pooled across all queue sets and process jobs based on the defined queue set weights. Within each queue set, threads are pooled and process jobs based on the defined queue weights. |

It should be appreciated that the system 100 in accordance with the systems and methods of the invention, provides a great deal of flexibility in defining queue structures, priority schemes, and job servicing schemes. Beneficially, this flexibility is presented to a system administrator, for example, in as simple a manner as possible. To provide this flexibility, the system administrator configuring priority and servicing schemes within the system 100 should be able to make a series of assumptions. Of course, the set up of the priority schemes, for example, will allow such assumptions to be made.

For example, a first assumption might be that prioritization and servicing applies in the same manner to all processing units. That is, although the system 100 may support schemes that vary across processing units, a system administrator should only be concerned with one prioritization and servicing scheme. Further, it should be appreciated that the prioritization and servicing scheme may be fixed for certain jobs. For example, the prioritization and servicing scheme may be fixed for both metadata browsing and for element browsing. As should be appreciated, metadata browsing is a type of request where the end user is looking through the set of OLAP questions (e.g. reports) that have been defined in the system. Element browsing is a type of request where the end user is looking through the set of data elements available in the database when asking a question. For example, if a user wants to request a report to show sales for a store during Q4 2000, and the system prompts the user by saying "which store" and shows the user a list of stores, the request to generate that list of stores from the database is an element browse.

To explain further, although priority schemes are available to all processing units, ease of use by end users may be helped by characterizing priority schemes in terms of a processing unit that executes queries. To the end user, configuring the priority and servicing scheme may be equivalent to configuring the priority and servicing scheme for executing jobs against a warehouse, for example.

In accordance with one embodiment of the systems and methods of the invention, a scheme, as described above, may be configured utilizing a two step process. First, the end user may identify a set of priority queues and the rules for assigning jobs to those queues. Secondly, the end user selects a servicing scheme to select jobs from the queues for execution.

A system designer, for example, may identify priority queues, i.e., or in other words define "priority", utilizing various approaches. In accordance with one embodiment of the systems and methods of the invention, a system designer defines a desired priority scheme using a list of available projects and a list of available user groups. Then, the system designer picks a particular project from the list of projects and a particular user group from the list of user groups. This combination of chosen items, from lists may be used to create a new "bucket", i.e., a new queue. Accordingly, a particular combination chosen by the system designer is assigned to the bucket or queue. Similarly, the system designer may assign any of a plurality of combinations to form additional queues as is desired.

It should be appreciated that it may be desirable to limit the number of combinations that are possible. For example, the system designer may limit himself or herself to three priority groups and three cost ranges, for example.

A system designer also selects a job servicing scheme. When selecting a job servicing scheme, a system designer selects from among the various job servicing schemes described above. Based on the list of queues defined, a system designer can sort the various defined queues into queue sets and specify job servicing algorithms or other processes at the queue set level as well as at the queue level.

Figure 12:
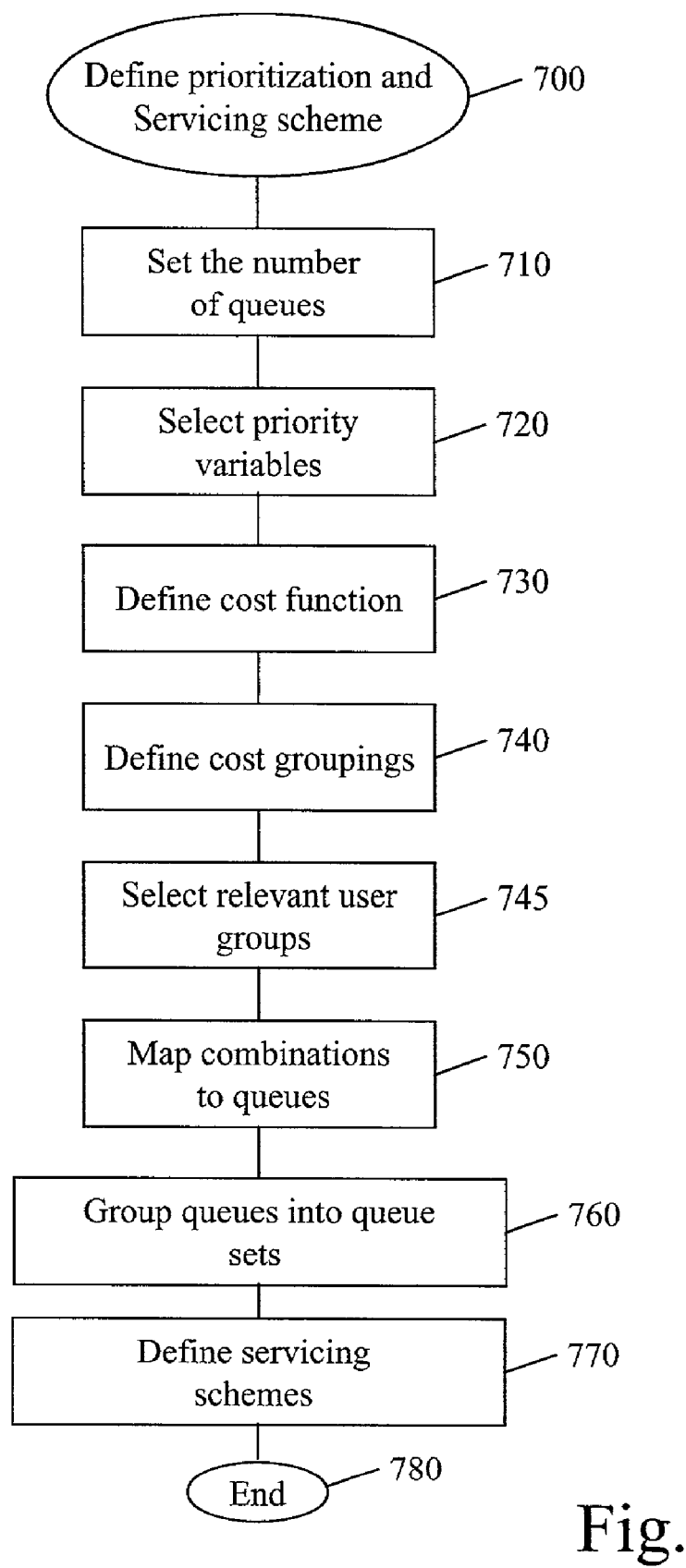
FIG. 12 is a flowchart showing a process to define a prioritization and servicing scheme according to an embodiment of the invention.

In accordance with one embodiment of the systems and methods of the invention, a system administrator, for example, may utilize a series of steps to define a prioritization and servicing scheme. FIG. 12 is a flow chart showing these steps to define a prioritization and servicing scheme. As shown in FIG. 12, the process starts in step 700. Then, the process passes to step 710 in which the number of queues is set. Then in step 720, the process selects the priority variables. Then, in step 730, the cost function is defined. After step 730, the process passes to step 740.

In step 740, the cost groupings are defined. In step 745, the relevant user groups are selected. Then, in step 750, the combinations to the queues are mapped. Then, in step 760, the queues are grouped into queue sets. Then, the process passes to step 770. In step 770, the servicing schemes are defined. Then, the process passes to step 780. In step 780, the process ends. Hereinafter, further aspects of the process of defining a prioritization and servicing scheme will be described with further reference to FIG. 12.

In accordance with embodiments of the systems and methods of the invention, each step is described in detail below. However, it should be appreciated that the invention is not limited to the process of FIG. 12 as described above. Further, such steps may be varied or altered as is desired.

The system administrator may first select the number of queues to be used in step 710. For example, the number of queues used may be limited to 5 queues.

The system administrator may then select the variables that may be considered in the priority function in step 720. Illustratively, the options may be project, user, and cost. It should be appreciated, only the variables selected will be utilized to factor into the function. Any of a variety of variables may be used as is desired.

If cost were selected as one of the relevant priority variables, the system administrator may define a cost function to map combinations of priority, type, historical cost and estimated cost, as described above, to unique values, for example.

Further, the system administrator may be able to define a linear combination of characteristics. For example, the system administrator may assign coefficients to each characteristic to determine the cost function. For example, the cost function may be defined as:

$$C = (0.5)*report\_priority + (0)*report\_type + (0.25)*historical\_cost + (0.25)*estimated\_cost$$

As described above, the report cost function may be defined in such a way that the possible values are normalized to a range of 0 to 100, in accordance with one embodiment of the systems and methods of the invention.

Further, it should be appreciated that once a cost function has been defined, the system administrator defines a set of priority groups based on report cost. For example, the user may decide to establish three groups:

1. Group A: Report cost between 0 and 40;
2. Group B: Report cost between 41 and 80; and
3. Group C: Report cost between 81 and 100.

As a result, it should be appreciated that the set of cost groupings cover each possible cost value from 0 to 100, for example.

As shown above in FIG. 12, the relevant user groups are selected in step 745. That is, if user was selected as one of the relevant priority variables, the system administrator, or other appropriate person, selects the defined user groups that will be relevant for establishing priority. It should be noted that all user groups defined on the system may not be appropriate for defining priority. That is, the system administrator will select only those groups that need to be considered for establishing priority. Further in accordance with one embodiment, the interface might also force the user to include an "all other" user group. This catch all will ensure that any user who submits a job will belong to at least one group that is used in determining priority.

Further, it is also possible for a job to be submitted by a user who belongs to more than one group. In this situation, there could be a conflict in the priority assigned to a job. Accordingly, the priority function should assign the highest possible priority to a job if the associated user could be considered a member of more than one user group.

As shown in step 750 of FIG. 12, the combinations are mapped into queues. That is, once priority variables have been selected, the system administrator maps all possible priority combinations to the available queues. Depending on the chosen priority variables, the user should see a list of projects, a list of user groups, and a list of cost groups. The user should, in accordance with embodiments of the methods and systems of the invention, be able to select combinations of these variables and associate them with the available queues. Further, each combination is assigned a queue.

In step 760 of FIG. 12, each queue is grouped into queue sets. At this point, the prioritization scheme is defined and the system administrator, or other appropriate person, is ready to define the servicing scheme for the available queues. The system administrator may choose to group queues into queue sets in order to apply a different servicing policy at the queue set level than at the queue level. The user may group the available queues into any number of queue sets, but queue sets may not be further grouped together.

In step 770, as shown in FIG. 12, the servicing schemes are defined. It should be noted that regardless of whether the system administrator has one or two levels in the queue structure, she may now define the thread service policy for each queue set. The user should see the available queues and the available processing threads, i.e., the database connections, that will serve those queues. All database connections may be associated to one of the available queue sets in accordance with embodiments of the methods and systems of the invention.

Accordingly, the system administrator defines the servicing policy within each queue set. For each queue set, the system administrator should select one of these servicing schemes defined above including fixed thread—selfish, fixed thread—cooperative, highest priority first, or waited share, for example, or another desired servicing scheme. Depending on the selection, the user also specifies relevant parameters to define the servicing scheme.

For example, in the fixed thread—selfish scheme, the user specifies the number of threads dedicated to each queue. For the fixed thread—cooperative scheme, the user specifies the number of threads dedicated to each queue. For the highest priority first scheme, no additional parameters are required.

Lastly, for the waited share scheme, the user defines a weighting factor for each queue. Illustratively, the weighting factors should be specified as integers between 0 and 255.

As described above, each of the incoming jobs may be serviced based on a servicing scheme. It should further be appreciated that servicing each of the incoming jobs based on the servicing scheme may include scheduling a job for servicing at a later time, in some manner, as is desired. Such a scheduled job might then take priority over future processing of jobs, for example.

In accordance with one embodiment, the system administrator may be able to manually change the priority of a particular job. That is, while a job is still in a query execution queue, the system administrator should have the ability to change its priority. Further, additional variations may be utilized further to the systems and methods described above. For example, the system 100 may provide the ability to configure different prioritization and servicing schemes for different pools of database connections. Further, the system 100 might provide that the prioritization functions change via a schedule, for example, change between working hours and off-working hours. Further, the service policies might change via a schedule.

It should be appreciated that a queue or a queue set need not be defined based on priority assigned to a job. Rather, queue sets could be defined based on other characteristics. For example, one or more queue sets may be created, wherein each queue set may be defined based on one or more queue set factors. The queue set factors may include one or more of a range of priority values, or any of a variety of other queue set factors, as may be desired.

It should be appreciated that the systems and methods of the invention are described above using the arrangement of a queue set, which contains multiple queues. However, the various features and concepts, i.e., the various priority and servicing schemes, described above dealing with the processing and manipulation of queue sets may also be applied to queues, whether such queues are in a queue set, or alternatively, not in a queue set. Further, the various features and concepts described above dealing with the processing and manipulation of queues, which are in a queue set, may also be applied to queues which are not disposed in a queue set.

In other words, the teachings above dealing with a queue set may be applied to queue. Further, as used herein, a "queue set" may be thought of and characterized as a queue. In a similar manner, what is described above as a "queue" might be thought of and characterized as a "sub-queue." Thus, a plurality of sub-queues may be disposed in a queue in the same manner as a plurality of queues are disposed in a queue set above, and further, such a queue/sub-queue arrangement may utilize the features and concepts described above, i.e., that were described for a queue set/queue arrangement. Further, it should be appreciated that the systems and methods of the invention may also be extended to further sub-sets of queues, i.e., a queue that contains a sub-queue, which in turn contains a sub-sub-queue. Accordingly, the systems and methods of the invention provide a wide variety of techniques to prioritize jobs, whether those jobs are disposed in a queue set, a queue, a sub-queue, or a sub-sub-queue.

While the foregoing description includes many details and specifications, it is to be understood that these have been included for purposes of explanation only, and are not to be interpreted as limitations of the present invention. Many modifications to the embodiments described above can be made without departing from the spirit and scope of the invention, as is intended to be encompassed by the claims and their legal equivalents.

What is claimed is:

1. A method of processing multiple incoming jobs in a reporting system, the method comprising the steps of:
   assigning each of the multiple incoming jobs a plurality of priority values; and
   servicing each of the multiple incoming jobs based on the plurality of priority values assigned to each of the multiple incoming jobs and on a non-random servicing scheme, wherein the servicing of each of the multiple incoming jobs includes scheduling each of the multiple incoming jobs for servicing at a later time.

2. The method of claim 1, wherein the step of assigning each of the multiple incoming jobs a plurality of priority values is based on at least one attribute of each of the multiple incoming jobs.

3. The method of claim 2, wherein the at least one attribute of each of the multiple incoming jobs includes at least one of an assigned value of each of the multiple incoming jobs, an estimated cost of each of the multiple incoming jobs, a project to which each of the multiple incoming jobs belongs, a requestor of each of the multiple incoming jobs, and a group to which the requester of each of the multiple incoming jobs belongs.

4. The method of claim 1, wherein each of the multiple incoming jobs is one of a report or a request.

5. The method of claim 1, wherein the non-random servicing scheme effects processing of each of the multiple incoming jobs based solely on the plurality of priority values of each of the multiple incoming jobs.

6. The method of claim 1, wherein the non-random servicing scheme effects processing of each of the multiple incoming jobs based on the plurality of priority values of each of the multiple incoming jobs and on a servicing formula.

7. The method of claim 6, wherein the servicing formula is a fair share formula, the fair share formula effecting servicing of each of the multiple of incoming jobs, which has been submitted by a requestor, based on a number of incoming jobs the requester has submitted.

8. The method of claim 6, wherein the servicing formula is a first in-first out formula.

9. The method of claim 6, wherein the servicing formula is overridden by an administrator.

10. The method of claim 6 wherein the servicing formula is altered on a scheduled basis.

11. The method of claim 1, further including the step of:
    placing each of the multiple incoming jobs into a selected queue, selected from a plurality of queues, based on the plurality of priority values assigned to each of the multiple incoming jobs; and
    the step of servicing each of the multiple incoming jobs is performed based on the selected queue into which each of the multiple incoming jobs is placed.

12. The method of claim 11, wherein assigning the plurality of priority values to each of the multiple incoming jobs is based on a priority function, the priority function determining the plurality of priority values based on a set of priority variables, the priority variables associated with each of the multiple incoming jobs.

13. The method of claim 11, wherein the selected queue includes a plurality of sub-queues, and wherein the step of assigning each of the multiple incoming jobs a plurality of priority values includes assigning a queue priority value and a sub-queue priority value; and
    the step of placing each of the multiple incoming jobs into a selected queue includes placing each of the multiple incoming jobs into the selected queue based on the queue priority value and into a selected sub-queue, within the selected queue, based on the sub-queue priority value.

14. The method of claim 11, wherein the non-random servicing scheme assigns threads to the plurality of queues.

15. The method of claim 11, wherein the priority scheme is altered on a schedule basis.

16. The method of claim 11, wherein the priority scheme is overridden by an administrator.

17. The method of claim 14, further including the step of moving the threads from a first queue to a second queue of the plurality of queues based on the non-random servicing scheme.

18. A system for processing multiple incoming jobs in a reporting system, the system comprising:
    a priority setting portion that assigns a plurality of priority values to each of the multiple incoming jobs,
    a service portion that processes each of the multiple incoming jobs based on the plurality of priority values assigned to each of the multiple incoming jobs and on a non-random servicing scheme, wherein the service portion that processes each of the multiple incoming Jobs includes scheduling each of the multiple incoming jobs for servicing at a later time.

19. The system of claim 18, wherein the priority setting portion assigns the plurality of priority values to each of the multiple incoming jobs based on at least one attribute of each of the multiple incoming jobs.

20. The system of claim 18, further including a queue placement portion that places each of the multiple incoming jobs into a selected queue, selected from a plurality of queues, based on the plurality of priority values assigned to each of the multiple incoming jobs; and the service portion processes each of the multiple incoming jobs based on the selected queue into which each of the multiple incoming jobs is placed.

21. A processor-readable medium comprising code for execution by a processor to prioritize and service multiple incoming jobs, that comprise one or more reports to be processed in a reporting system, the medium comprising:
    code for assigning a plurality of priority values to each of the multiple incoming jobs; and
    code for processing each of the multiple incoming jobs based on the plurality of priority values assigned to each of the multiple incoming jobs and a non-random servicing scheme, wherein the code for processing each of the multiple incoming jobs includes scheduling each of the multiple incoming jobs for servicing at a later time.

22. The medium of claim 21, wherein the code for assigning a plurality of priority values to each of the multiple incoming jobs uses at least one attribute of each of the multiple incoming jobs.

23. The medium of claim 21, wherein the code for assigning a plurality of priority values to each of the multiple incoming jobs effects placement of each of the multiple incoming jobs into a selected queue, which is selected from a plurality of queues, and the code for processing each of the multiple incoming jobs processes each of the multiple incoming jobs based on the selected queue into which each of the multiple incoming jobs is placed.

* * * * *